(12) United States Patent
Hwang et al.

(10) Patent No.: US 12,236,943 B2
(45) Date of Patent: Feb. 25, 2025

(54) APPARATUS AND METHOD FOR GENERATING LIP SYNC IMAGE

(71) Applicant: DEEPBRAIN AI INC., Seoul (KR)

(72) Inventors: Guem Buel Hwang, Seoul (KR); Gyeong Su Chae, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 410 days.

(21) Appl. No.: 17/764,651

(22) PCT Filed: Jun. 8, 2021

(86) PCT No.: PCT/KR2021/007125
§ 371 (c)(1),
(2) Date: Mar. 29, 2022

(87) PCT Pub. No.: WO2022/149667
PCT Pub. Date: Jul. 14, 2022

(65) Prior Publication Data
US 2023/0178072 A1 Jun. 8, 2023

(30) Foreign Application Priority Data
Jan. 11, 2021 (KR) .................. 10-2021-0003375

(51) Int. Cl.
*G10L 21/10* (2013.01)
*G10L 15/16* (2006.01)
*G10L 15/25* (2013.01)

(52) U.S. Cl.
CPC .............. *G10L 15/16* (2013.01); *G10L 21/10* (2013.01); *G10L 15/25* (2013.01); *G10L 2021/105* (2013.01)

(58) Field of Classification Search
CPC .... G10L 2021/105; G10L 21/10; G10L 15/25
See application file for complete search history.

(56) References Cited

U.S. PATENT DOCUMENTS

2017/0243387 A1  8/2017 Li et al.
2018/0039990 A1* 2/2018 Lindemann ............ G06V 40/19
(Continued)

FOREIGN PATENT DOCUMENTS

KR  10-2019-0114150 A  10/2019
KR  10-2020-0112647 A  10/2020

OTHER PUBLICATIONS

Jung-Woo Lee et al, "Korean Lip-Sync using Conditional GAN" The Magazine of the IEIE; Aug. 2020, pp. 1241-1243, URL <http://www.dbpia.co.kr/journal/articleDetail?nodeId=NODE10448132> (English translation of abstract is included in the second page.).

(Continued)

*Primary Examiner* — Feng-Tzer Tzeng
(74) *Attorney, Agent, or Firm* — The PL Law Group, PLLC

(57) ABSTRACT

An apparatus for generating a lip sync image according to disclosed embodiment has one or more processors and a memory which stores one or more programs executed by the one or more processors. The apparatus includes a first artificial neural network model configured to generate an utterance match synthesis image by using a person background image and an utterance match audio signal corresponding to the person background image as an input, and generate an utterance mismatch synthesis image by using the person background image and an utterance mismatch audio signal not corresponding to the person background image as an input, and a second artificial neural network model configured to output classification values for an input pair in which an image and a voice match and an input pair in which an image and a voice do not match by using the input pairs as an input.

8 Claims, 4 Drawing Sheets

(56) References Cited

U.S. PATENT DOCUMENTS

2019/0206441 A1* 7/2019 De la Torre ......... G06V 10/758
2021/0248801 A1* 8/2021 Li ........................ G06T 13/205

OTHER PUBLICATIONS

Jae Hyun Lee et al, "Avatar's Lip Synchronization in Talking Involved Virtual Reality" Korea Computer Graphics Society; vol. 26, No. 4, p. 9-15 DOI: 10.15701/kcgs.2020.26.4.9 (English translation of abstract is included in the first page.).

Office action issued on Apr. 29, 2022 from Korean Patent Office in a counterpart Korean Patent Application No. 10-2021-0003375 (all the cited references are listed in this IDS.).

Konstantinos Vougioukas et al., "Realistic Speech-Driven Facial Animation with GAN", International Journal of Computer Vision, 2020 vol. 128, pp. 1398-1413, https://doi.org/10.1007/s11263-019-01251-8.

Ruobing Zheng et al., "Photorealistic Lip Sync with Adversarial Temporal Convolutional Networks", arXiv: 2002.08700v1 [cs.CV] Feb. 20, 2020.

Hao Zhu et al., "Arbitrary talking face generation via attentional audio-visual coherence learning" arXiv: 1812.06589x2, [cs.CV], and May 13, 2020.

K R Prajwal et al., "A Lip Sync Expert Is All You Need for Speech to Lip Generation In The Wild" arXiv: 2008.10010v1 [cs.CV] Aug. 23, 2020.

* cited by examiner

APPARATUS AND METHOD FOR GENERATING LIP SYNC IMAGE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/007125, filed Jun. 8, 2021, which claims priority to the benefit of Korean Patent Application No. 10-2021-0003375 filed in the Korean Intellectual Property Office on Jan. 11, 2021, the entire contents of which are incorporated herein by reference.

BACKGROUND

1. Technical Field

Embodiments of the present invention relate to a lip sync image generation technology.

2. Background Art

Nowadays, with the development of the artificial intelligence technology field, various types of content are generated based on an artificial intelligence technology. For example, when there is a voice message to be delivered, it may be desirable to generate an utterance video (lip sync video) in which the voice message sounds as if it is being delivered by a famous person (e.g., president or the like) so as to attract the attention of people. This is implemented by generating lip shapes or the like suitable for a specific message so that the lip shapes look as if a famous person is delivering the specific message in an image of the famous person.

A learning model for generating a lip sync image is a model which generates a lip sync image such that an input voice and a mouth shape match when any voice is input when there is an original image, and which uses a personal background image and a voice as an input to learn a target image corresponding thereto. At this time, since there is no actual target image corresponding to a voice not matching the person background image, the lip sync image generation model has a limitation in that training is performed using only a voice matching the person background image, resulting in a problem in which a generated lip sync image is unnatural.

SUMMARY

Embodiments of the present invention is to provide an apparatus and method for generating a lip sync image capable of synthesizing a natural lip sync image.

According to a disclosed embodiment, an apparatus for generating a lip sync image having one or more processors and a memory which stores one or more programs executed by the one or more processors includes a first artificial neural network model configured to generate an utterance match synthesis image by using a person background image and an utterance match audio signal corresponding to the person background image as an input, and generate an utterance mismatch synthesis image by using the person background image and an utterance mismatch audio signal not corresponding to the person background image as an input, and a second artificial neural network model configured to output classification values for an input pair in which an image and a voice match and an input pair in which an image and a voice do not match by using the input pairs as an input.

The person background image may be an image in which a portion associated with an utterance of a person is masked.

The second artificial neural network model may be trained to classify the input pair in which an image and a voice match as True, and to classify the input pair in which an image and a voice do not match as False.

The second artificial neural network model may be configured to receive the utterance mismatch synthesis image generated by the first artificial neural network model and the utterance mismatch audio signal used as the input when generating the utterance mismatch synthesis image and classify the utterance mismatch synthesis image and the utterance mismatch audio signal as True, and propagate a generative adversarial error may first artificial neural network model through an adversarial learning method.

The first artificial neural network model may include a first encoder configured to use the person background image as an input, and extracts an image feature vector from the input person background image, a second encoder configured to use the utterance match audio signal corresponding to the person background image as an input, and extract a voice feature vector from the input utterance match audio signal, a combiner configured to generate a combined vector by combining the image feature vector and the voice feature vector, and a decoder configured to use the combined vector as an input, and generates the utterance match synthesis image based on the combined vector.

An objective function $L_{reconstruction}$ for the generation of the utterance match synthesis image of the first artificial neural network model may be represented by the following equation.

$$L_{reconstruction}=\|I_i-\hat{I}_{ii}\| \quad \text{(Equation)}$$

$I_i$: Original utterance image
$\hat{I}_{ii}$: Utterance match synthesis image
$\|A-B\|$: Function for obtaining difference between A and B An objective function $L_{discriminator}$ of the second artificial neural network model may be represented by the following equation.

$$L_{discriminator}=\log(1-D(I_i,A_i))+\log(D(I_i,A_j)) \quad \text{(Equation)}$$

D: Neural network of the second artificial neural network model
$(I_i, A_i)$: Input pair in which an image and a voice match (i-th image and i-th voice)
$(I_i, A_j)$: Input pair in which an image and a voice do not match (i-th image and j-th voice)

An adversarial objective function $L_{adversarial}$ for the generation of the utterance mismatch synthesis image of the first artificial neural network model may be represented by the following equation.

$$L_{adversarial}=-\log(D(G(M_i*I_i,A_j),A_j)) \quad \text{(Equation)}$$

G: Neural network constituting the first artificial neural network model
$M_i*I_i$: Person background image in which portion associated with utterance is masked ($M_i$: mask)
$G(M_i*I_i, A_j)$: Utterance mismatch synthesis image generated by the first artificial neural network model
$A_j$: Utterance mismatch audio signal not corresponding to person background image A final objective function $L_T$ for the generation of the utterance match synthesis image and the utterance mismatch synthesis image of first artificial neural network model may be represented by the following equation.

$$L_T = L_{reconstruction} + \lambda L_{adversarial} \quad \text{(Equation)}$$

$\lambda$: Weight

According to a disclosed embodiment, a method for generating a lip sync image performed by a computing device having one or more processors and a memory which stores one or more programs executed by the one or more processors includes generating, in a first artificial neural network model, an utterance match synthesis image by using a person background image and an utterance match audio signal corresponding to the person background image as an input, generating, in a first artificial neural network model, an utterance mismatch synthesis image by using the person background image and an utterance mismatch audio signal not corresponding to the person background image as an input, and outputting, in a second artificial neural network model, classification values for an input pair in which an image and a voice match and an input pair in which an image and a voice do not match by using the input pairs as an input.

According to a disclosed embodiment, when an utterance mismatch synthesis image generated by a first artificial neural network model and an utterance mismatch audio signal are input, a second artificial neural network model determines the degree of match between the utterance mismatch synthesis image and the utterance mismatch audio signal and propagates a generative adversarial error for the degree of match to the first artificial neural network model, and the first artificial neural network model learns through an adversarial learning method such that the second artificial neural network model classifies the utterance mismatch synthesis image and the corresponding utterance mismatch audio signal as True, so that it is possible to generate a more natural utterance synthesis image even when a person background image and an utterance audio signal not matching the person background image are input in the first artificial neural network model.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only illustrative, and the present invention is not limited thereto.

In describing embodiments of the present invention, when a specific description of known technology associated with the present invention is deemed to make the gist of the present invention unnecessarily vague, the detailed description thereof will be omitted. The terms used below are defined in consideration of functions in the present invention, but may vary in accordance with the customary practice or the intention of a user or an operator. Therefore, the terms should be defined based on whole content throughout the present specification. The terms used herein are only for describing the embodiments of the present invention, and should not be construed as limited. A singular expression includes a plural meaning unless clearly used otherwise. In the present description, expressions such as "include" or "have" are for referring to certain characteristics, numbers, steps, operations, components, and some or combinations thereof, and should not be construed as excluding the presence or possibility of one or more other characteristics, numbers, steps, operations, components, and some or combinations thereof besides those described.

In the following description, the terms "transmission," "communication," and "reception" of a signal or information and other similar terms may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same applies to "reception" of the signal or information. In addition, in the present specification, a meaning in which two or more pieces of data or information are "related" indicates that when any one piece of data (or information) is obtained, at least a portion of other data (or information) may be obtained based thereon.

Furthermore, the terms "first," "second," and the like may be used for describing various elements, but the elements should not be construed as being limited by the terms. These terms may be used for distinguishing one element from another element. For example, a first element could be termed a second element and vice versa without departing from the scope of the present invention.

Figure 1:
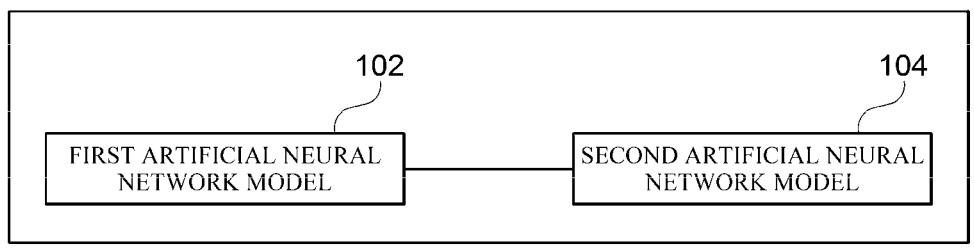
FIG. 1 is a diagram showing the configuration of an apparatus for generating a lip sync image according to an embodiment of the present invention.

FIG. 1 is a diagram showing the configuration of an apparatus for generating a lip sync image according to an embodiment of the present invention.

Referring to FIG. 1, an apparatus for generating a lip sync image 100 may include a first artificial neural network model 102 and a second artificial neural network model 104.

The first artificial neural network model 102 may be a model to be trained to generate an utterance match synthesis image by using a person background image and an utterance single audio signal as an input. Here, the person background image is an image in which a person utters (speaks), and may be an image in which a portion associated with the utterance of the person in the image is masked. Here, the utterance match audio signal may be an audio portion in the person background image (i.e., an image in which a person utters). That is, the utterance match audio signal may be a voice signal which matches (to be matched) a figure in which the corresponding person utters in the person background image.

Here, the first artificial neural network model 102 may be trained to generate the utterance synthesis image by restoring the masked portion associated with the utterance in the person background image through the input utterance match audio signal.

At this time, the first artificial neural network model 102 is trained to generate the utterance match synthesis image using the utterance match audio signal matching the person background image, in order to generate a more natural utterance synthesis image when the person back ground image and an utterance audio signal not matching the person background image (i.e., an utterance mismatch audio signal) are input in a reasoning process after the training, it is necessary to induce the training by separating a control region between the person background image and the utterance audio signal. That is, it is necessary to allow the portion associated with an utterance to be controlled through the utterance audio signal, and to prevent the portion from being controlled by the person background image in the first artificial neural network model 102.

Therefore, in a disclosed embodiment, it is possible to allow the first artificial neural network model 102 to use a person background image and an utterance mismatch audio signal (an utterance audio signal not matching the person background image) as an input to generate an utterance mismatch synthesis image. For example, when a person background image is an image in which a person in the image utters, "It's going to be sunny today," an utterance mismatch audio signal may be an audio signal of "I felt blue yesterday," which does not match the person background image.

In addition, the second artificial neural network model 104 may be trained to classify as True when a person image and an utterance audio signal matching the person image (i.e., an input pair in which an image and a voice match) is input, and to classify as False when a person image and an utterance audio signal not matching the person image (i.e., an input pair in which an image and a voice do not match) is input.

In addition, when the utterance mismatch synthesis image generated by the first artificial neural network model 102 and the utterance mismatch audio signal (the utterance mismatch audio signal used as the input when generating the utterance mismatch synthesis image) are input, the second artificial neural network model 104 may determine the degree of match between the utterance mismatch synthesis image and the utterance mismatch audio signal and propagate a generative adversarial error for the degree of match to the first artificial neural network model 102. In addition, the first artificial neural network model 102 may be trained through an adversarial learning method such that the second artificial neural network model 104 classifies the utterance mismatch synthesis image and the corresponding utterance mismatch audio signal as True.

As such, since the first artificial neural network model 102 is trained through an adversarial learning method such that the second artificial neural network model 104 classifies the utterance mismatch synthesis image and the utterance mismatch audio signal as True, it is possible to generate a more natural utterance synthesis image even when a person background image and an utterance audio signal not matching the person background image are input in the first artificial neural network model 102.

Figure 2:
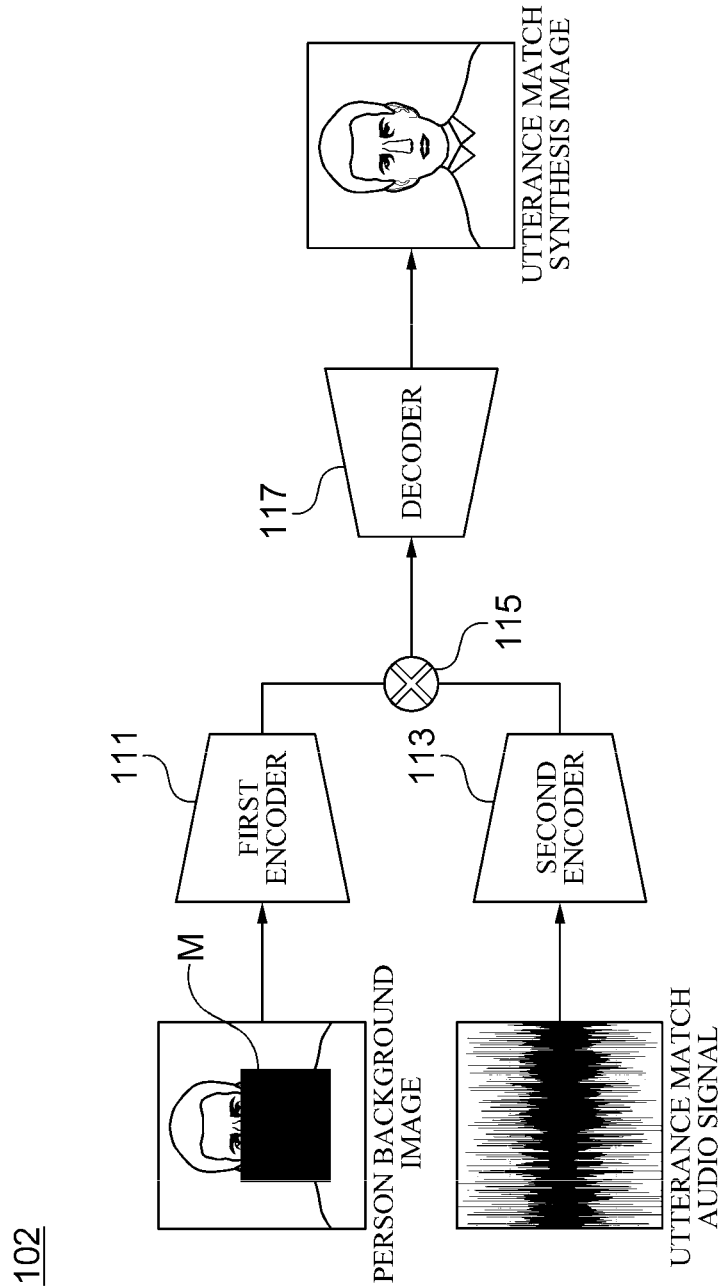
FIG. 2 is a diagram schematically showing a state in which a first artificial neural network model generates an utterance match synthesis image according to an embodiment of the present invention.

FIG. 2 is a diagram schematically showing a state in which the first artificial neural network model 102 generates an utterance match synthesis image according to an embodiment of the present invention.

Referring to FIG. 2, the first artificial neural network model 102 may include a first encoder 111, a second encoder 113, a combiner 115, and a decoder 117.

In an example embodiment, the first artificial neural network model 102 may be implemented by a convolutional neural network (CNN)-based machine learning technology, but the machine learning technology is not limited thereto, and other various machine learning technologies may be applied.

The first encoder 111 may be trained to extract an image feature vector by using a person background image as an input. Hereinafter, the term "vector" may also be used to refer to include "tensor".

Here, the person background image input to the first encoder 111 is an image in which a person utters (speaks). The person background image may be an image including a face and upper body of a person. That is, the person background image may be an image including not only the face but also the upper body of a person who utters so as to show movements of the face, neck, shoulder, and the like of the corresponding person, but is not limited thereto, and may be an image including the face of the person.

A portion associated with an utterance in the person background image input to the first encoder 111 may be masked. That is, the portion (e.g., a mouth and portions around the mouth) associated with the utterance in the person background image may be covered by a mask M. In addition, during a masking process, portions associated with facial movement, neck movement, shoulder movement, and the like as a result of the utterance of the person in the person background image may not be masked. Then, the first encoder 111 extracts an image feature vector of a portion excluding the portion associated with the utterance in the person background image.

In an example embodiment, the first encoder 111 may include at least one convolutional layer and at least one pooling layer. The convolutional layer, while moving a filter of a preset size (e.g., 3×3 pixel size) at regular intervals in the input person background image, may extract a feature value of pixels corresponding to the filter. The pooling layer may receive an output from the convolutional layer as an input to perform down sampling.

The second encoder 113 may use the utterance match audio signal as an input. The second encoder 113 may be trained to extract a voice feature vector by using the utterance match audio signal as an input.

Here, the utterance match audio signal corresponds to an audio portion in the person background image (i.e., an image in which a person utters) input to the first encoder 111. In other words, a video portion in a video in which a person utters may be input to the first encoder 111, and an audio portion may be input to the second encoder 113. The second encoder 113 may include at least one convolutional layer and at least one pooling layer, but a neural network structure of the second encoder 113 is not limited thereto.

The person background image input to the first encoder 111 and the utterance match audio signal input to the second encoder 113 may be synchronized in time. That is, in a section of the same time band in a video in which a person utters, video may be input to the first encoder 111, and audio may be input to the second encoder 113. For example, when the person background image is an image for time t from a specific point of time, the utterance match audio signal may be a voice for the time t from the same point of time. Here, the person background image and the utterance match audio signal may be input to the first encoder 111 and the second encoder 113 every preset unit time (e.g., one frame or a plurality of successive frames).

The combiner 115 may generate a combined vector by combining the image feature vector output from the first encoder 111 and the voice feature vector output from the second encoder 113. In an example embodiment, the combiner 115 may concatenate the image feature vector and the voice feature vector to generate a combined vector, but is not limited thereto.

The decoder 117 may generate an utterance match synthesis image by using the combined vector output from the combiner 115 as an input. Specifically, the decoder 117 may be trained to restore the portion (i.e., the portion associated with the utterance) covered by the mask M of the image feature vector (i.e., a video portion in a video in which a person utters, a feature of a portion in which a portion associated with an utterance is covered by a mask) output from the first encoder 111, on the basis of the voice feature vector (i.e., a feature of an audio portion in the video in which a person utters) output from the second encoder 113.

That is, when a portion associated with an utterance is masked in the person background image, the decoder 117 may be a model trained to restore the masked region using the utterance match audio signal. The decoder 117 may compare a generated utterance match synthesis image with an original utterance image (i.e., a correct value), and may adjust a training parameter (e.g., a loss function, a soft max function, etc.) such that the generated utterance match synthesis image approximates the original utterance image (i.e., to minimize the difference with the original utterance image).

Meanwhile, an objective function $L_{reconstruction}$ for the generation of the utterance match synthesis image by the first artificial neural network model 102 using the person background image and the utterance match audio signal as an input may be represented by Equation 1 below.

$$L_{reconstruction} \leq \|I_i - \hat{I}_{ii}\| \qquad \text{(Equation 1)}$$

$I_i$: Original utterance image
$\hat{I}_{ii}$: Utterance match synthesis image
$\|A-B\|$: Function obtaining difference between A and B, which may include, for example, a function obtaining the Euclidean distance (L2 distance) or the Manhattan distance (L1 distance) of A and B.

Figure 3:
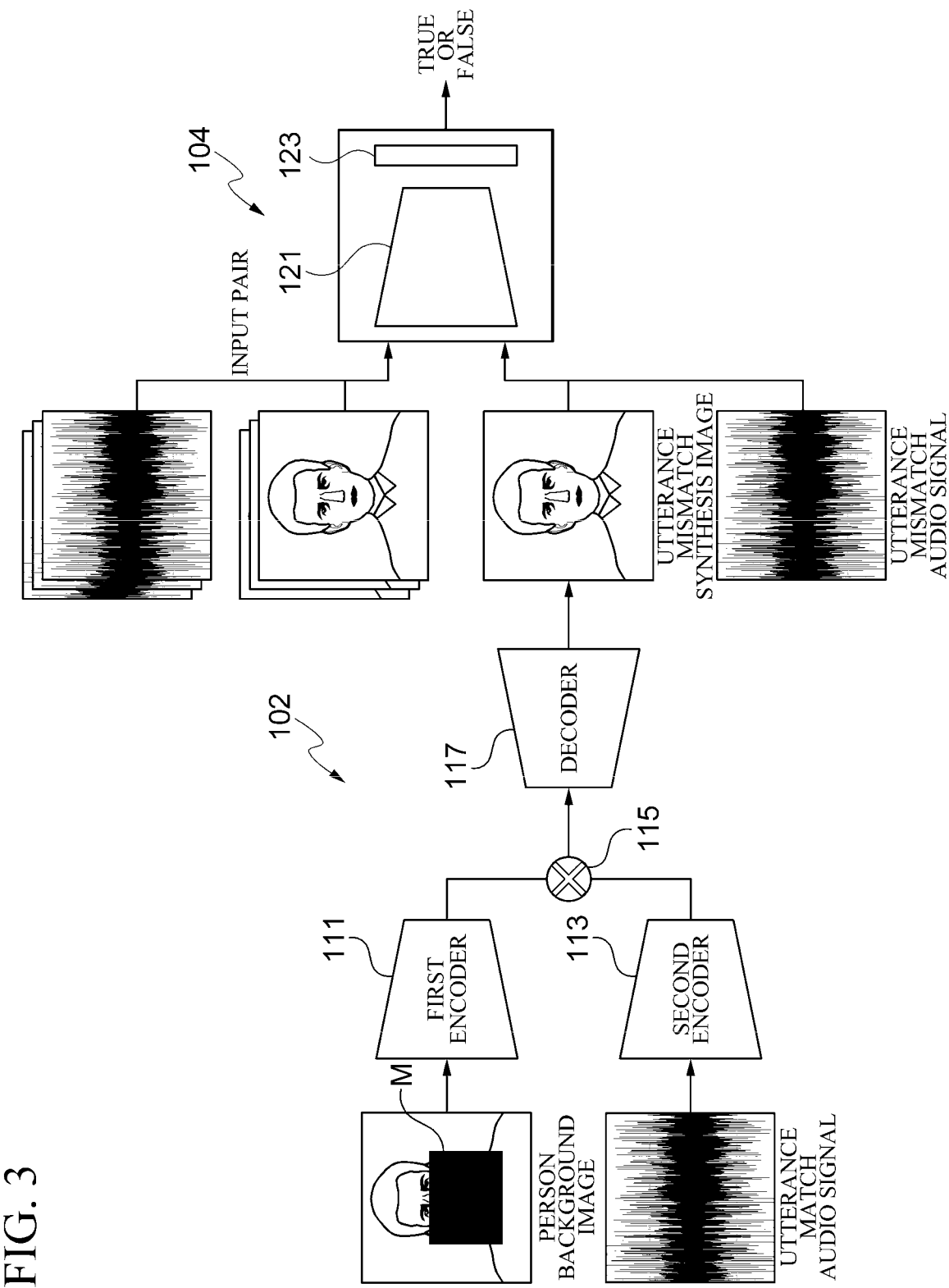
FIG. 3 is a diagram showing a state of learning a case in which an input image and an input voice do not match in an apparatus for generating a lip sync image according to an embodiment of the present invention.

FIG. 3 is a diagram showing a state of learning a case in which an input image and an input voice do not match in an apparatus for generating a lip sync image according to an embodiment of the present invention.

Referring to FIG. 3, the first artificial neural network model 102 may generate an utterance mismatch synthesis image by using the person background image and an utterance audio signal not corresponding to the person background image (i.e., an utterance mismatch audio signal) as an input.

Specifically, the first encoder 111 may use the person background image as an input to extract the image feature vector. The second encoder 113 may use the utterance mismatch audio signal as an input to extract a voice feature vector. The combiner 115 may combine the image feature vector and the voice feature vector to generate a combined vector. The decoder 117 may use the combined vector as an input to generate the utterance mismatch synthesis image. The utterance mismatch synthesis image may be input to the second artificial neural network model 104.

The second artificial neural network model 104 may receive an input pair in which an image and a voice match and an input pair in which an image and a voice do not match, and may classify the input pairs as True or False to output classification values. That is, the second artificial neural network model 104 may be trained to output a classification value which classifies as True when an input pair in which an image and a voice match is input, and to output a classification value which classifies as False when an input pair in which an image and a voice do not match is input.

For example, the second artificial neural network model 104 may be trained to use a person background image and an utterance match audio signal input to the first artificial neural network model 102 as an input pair in which an image and a voice match, but is not limited thereto, and may be trained to use the utterance match synthesis image generated by the first artificial neural network model 102 and the utterance match audio signal as the input pair in which an image and a voice match.

In an example embodiment, the second artificial neural network model 104 may include a third encoder 121 and a classifier 123. The third encoder 121 may extract image and voice feature vectors from an input image and voice pair. The classifier 123 may output a classification value which classifies as True or False on the basis of the image and voice feature vector output from the third encoder 121.

However, the embodiment is not limited thereto, and the third encoder 121 may receive an image and a voice separately, extract an image feature vector from the input image and extract a voice feature vector from the input voice, and output a combined vector in which the image feature vector and the voice feature vector are combined. In addition, the classifier 123 may output a classification value which classifies as True or False on the basis of the combined vector.

In addition, when the utterance mismatch synthesis image generated by the first artificial neural network model 102 and the utterance mismatch audio signal (the utterance mismatch audio signal used as the input when generating the utterance mismatch synthesis image) are input, the second artificial neural network model 104 may determine the degree of match between the utterance mismatch synthesis image and the utterance mismatch audio signal and propagate a generative adversarial error for the degree of match to the first artificial neural network model 102.

Here, the first artificial neural network model 102 and the second artificial neural network model 103 may form a generative adversarial network. The first artificial neural network model 102 may correspond to a generator in the generative adversarial network, and the second artificial neural network model 104 may correspond to a discriminator in the generative adversarial network. That is, the first artificial neural network model 102 is a separate neural network model which generates the utterance match synthesis image, and also, may constitute a part (i.e., a generator) of the generative adversarial network which generates the utterance mismatch synthesis image.

At this time, an objective function $L_{discriminator}$ of the second artificial neural network model 104 may be represented by Equation 2 below.

$$L_{discriminator} = \log(1 - D(I_i, A_i)) + \log(D(I_i, A_j)) \qquad \text{(Equation 2)}$$

D: Neural network of the second artificial neural network model
$(I_i, A_i)$: Input pair in which an image and a voice match (i-th image and i-th voice)
$(I_i, A_j)$: Input pair in which an image and a voice do not match (i-th image and j-th voice)

In addition, an adversarial objective function $L_{adversarial}$ of the first artificial neural network model 102 for generating the utterance mismatch synthesis image may be represented by Equation 3 below.

$$L_{adversarial} = -\log(D(G(M_i * I_i, A_j), A_j)) \qquad \text{(Equation 3)}$$

G: Neural network constituting the first artificial neural network model $M_i*I_i$: Person background image in which portion associated with utterance is masked ($M_i$: mask)

$G(M_i*I_i, A_j)$: Utterance mismatch synthesis image generated by the first artificial neural network model $A_j$: Utterance mismatch audio signal not corresponding to person background image The adversarial objective function $L_{adversarial}$ may be an objective function which induces the first artificial neural network model 102 to classify an input pair of utterance mismatch synthesis image generated by the first artificial neural network model 102 and the utterance mismatch audio signal as True in the second artificial neural network model 104.

In addition, a final objective function $L_T$ of the first artificial neural network model 102 for generating the utterance match synthesis image and the utterance mismatch synthesis image may be represented by Equation 4 below.

$$L_T = L_{reconstruction} + \lambda L_{adversarial} \quad \text{(Equation 4)}$$

$\lambda$: Weight

In addition, an optimized parameter $\theta_g*$ of the first artificial neural network model 102 may be represented by Equation 5 below.

$$\theta_g* = \arg\min_{\theta_d}(L_T) \quad \text{(Equation 5)}$$

Here, $\arg\min_{\theta_g}$ represents a function that obtains $\theta_g$ for minimizing the $L_T$. In addition, $\theta_g$ represents a parameter of a neural network G.

Figure 4:
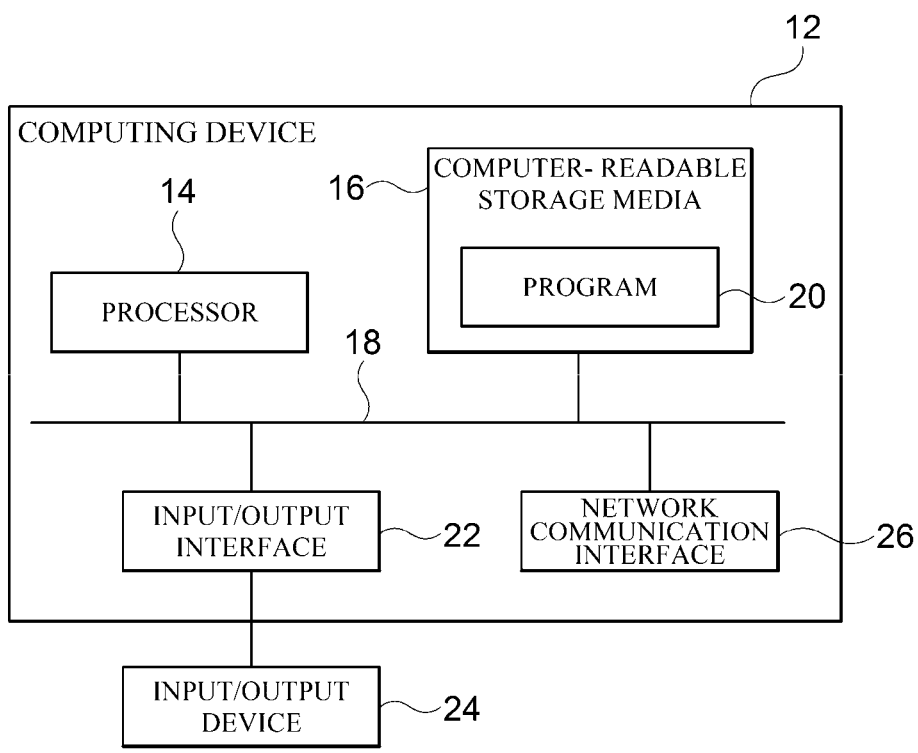
FIG. 4 is a block diagram for describing an example of a computing environment including a computing device suitable for being used in example embodiments.

FIG. 4 is a block diagram for describing an example of a computing environment 10 including a computing device suitable for being used in example embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the apparatus for generating a lip sync image 100.

The computing device 12 includes at least one processor 14, a computer-readable storage medium 16, and a communication bus 18. The processor 14 may allow the computing device 12 to operate according to the example embodiment mentioned above. For example, the processor 14 may execute one or more programs stored in the computer-readable storage medium 16. The one or more programs may include one or more computer-executable commands, and when executed by the processor 14, the computer-executable command may be configured to allow the computing device 12 to perform operations according to the example embodiment.

The computing device 12 may also include one or more input/output interfaces 22 which provide an interface for one or more input/output devices 24, and one or more network communication interfaces 26. A program 20 stored in the computer-readable storage medium 16 includes a set of commands executable by the processor 14. In one embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media accessible by the computing device 12 and capable of storing desired information, or any suitable combination thereof.

The communication bus 18 includes the processor 14 and the computer-readable storage medium 16 to interconnect various other components of the computing device 12.

The computing device 12 may also include one or more input/output interfaces 22 which provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or track pad), a keyboard, a touch input device (such as a touch pad or touch screen), a voice or sound input device, an input device such as various types of sensor devices and/or photographing devices, and/or an output device such as a display device, a printer, a speaker, and/or a network card. The exemplary input/output device 24 may be included inside the computing device 12 as one component constituting the computing device 12, or may be connected to the computing device 12 as a separate device distinct from the computing device 12.

Although the example embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An apparatus for generating a lip sync image having one or more processors and a memory which stores one or more programs executed by the one or more processors, the apparatus comprising:

a first artificial neural network model configured to generate an utterance match synthesis image by using a person background image and an utterance match audio signal as an input, and generate an utterance mismatch synthesis image by using the person background image and an utterance mismatch audio signal as an input; and a second artificial neural network model configured to output classification values for an input pair in which an image and a voice match and an input pair in which an image and a voice do not match by using the input pairs as an input, wherein the utterance match audio signal is a voice signal which matches a figure in which the corresponding person utters in the person background image, wherein the utterance mismatch audio signal is a voice signal which does not match the figure in which the corresponding person utters in the person background image, wherein the second artificial neural network model is trained to classify the input pair in which an image and a voice match as True, and to classify the input pair in which an image and a voice do not match as False, wherein the first artificial neural network model is configured to receive the utterance mismatch synthesis image generated by the first artificial neural network model and the utterance mismatch audio signal used as the input when generating the utterance mismatch synthesis image and classify the utterance mismatch synthesis image and the utterance mismatch audio signal as True, and propagate a generative adversarial error to the first artificial neural network model through an adversarial learning method.

2. The apparatus of claim 1, wherein the person background image is an image in which a portion associated with an utterance of a person is masked.

3. The apparatus of claim 1, wherein the first artificial neural network model comprises:
   a first encoder configured to use the person background image as an input, and extract an image feature vector from the input person background image;
   a second encoder configured to use the utterance match audio signal corresponding to the person background image as an input, and extract a voice feature vector from the input utterance match audio signal;
   a combiner configured to generate a combined vector by combining the image feature vector and the voice feature vector; and
   a decoder configured to use the combined vector as an input, and generate the utterance match synthesis image based on the combined vector.

4. The apparatus of claim 3, wherein an objective function $L_{reconstruction}$ for the generation of the utterance match synthesis image of the first artificial neural network model is represented by the following equation:

$$L_{reconstruction} = \|I_i - \hat{I}_{ii}\|$$

where $I_i$ is Original utterance image;
$\hat{I}_{ii}$ is Utterance match synthesis image; and
$\|A-B\|$ is Function for obtaining difference between A and B.

5. The apparatus of claim 4, wherein an objective function $L_{discriminator}$ of the second artificial neural network model is represented by the following equation:

$$L_{discriminator} = \log(1-D(I_i,A_j)) + \log(D(I_i,A_i))$$

where D is Neural network of the second artificial neural network model;
$(I_i, A_i)$ is Input pair in which an image and a voice match (i-th image and i-th voice); and
$(I_i, A_j)$ is Input pair in which an image and a voice do not match (i-th image and j-th voice).

6. The apparatus of claim 5, wherein an adversarial objective function $L_{adversarial}$ for the generation of the utterance mismatch synthesis image of the first artificial neural network model is represented by the following equation:

$$L_{adversarial} = -\log(D(G(M_i^* I_i,A_i),A_j))$$

where G is Neural network constituting the first artificial neural network model;
$M_i^* I_i$ is Person background image in which portion associated with utterance is masked ($M_i$: mask);
$G(M_i^* I_i, A_j)$ is Utterance mismatch synthesis image generated by the first artificial neural network model; and
$A_j$ is Utterance mismatch audio signal not corresponding to person background image.

7. The apparatus of claim 6, wherein a final objective function $L_T$ for the generation of the utterance match synthesis image and the utterance mismatch synthesis image of first artificial neural network model is represented by the following equation:

$$L_T = L_{reconstruction} + \lambda L_{adversarial}$$

where $\lambda$ is Weight.

8. A method for generating a lip sync image performed by a computing device having one or more processors and a memory which stores one or more programs executed by the one or more processors, the method comprising:
   generating, in a first artificial neural network model, an utterance match synthesis image by using a person background image and an utterance match audio signal as an input;
   generating, in a first artificial neural network model, an utterance mismatch synthesis image by using the person background image and an utterance mismatch audio signal as an input; and
   outputting, in a second artificial neural network model, classification values for an input pair in which an image and a voice match and an input pair in which an image and a voice do not match by using the input pairs as an input,
   wherein the utterance match audio signal is a voice signal which matches a figure in which the corresponding person utters in the person background image,
   wherein the utterance mismatch audio signal is a voice signal which does not match the figure in which the corresponding person utters in the person background image,
   wherein the second artificial neural network model is trained to classify the input pair in which an image and a voice match as True, and to classify the input pair in which an image and a voice do not match as False,
   wherein the first artificial neural network model is configured to receive the utterance mismatch synthesis image generated by the first artificial neural network model and the utterance mismatch audio signal used as the input when generating the utterance mismatch synthesis image and classify the utterance mismatch synthesis image and the utterance mismatch audio signal as True, and propagate a generative adversarial error to the first artificial neural network model through an adversarial learning method.

* * * * *